(12) United States Patent
Kasso et al.

(10) Patent No.: US 10,051,043 B2
(45) Date of Patent: Aug. 14, 2018

(54) SYSTEM AND METHOD FOR JMX SUPPORT IN A MULTITENANT APPLICATION SERVER ENVIRONMENT

(71) Applicant: Oracle International Corporation, Redwood Shores, CA (US)

(72) Inventors: Christopher Kasso, Los Altos, CA (US); Peter Bower, Hollis, NH (US); Qianhong Pan, Portland, OR (US); Sanjeeb Sahoo, Cupertino, CA (US); Nazrul Islam, Santa Clara, CA (US); Rajiv Mordani, Santa Clara, CA (US); Byron Nevins, Pacifica, CA (US); MD. Sazzad Hossain, Redwood Shores, CA (US); Rehana Tabassum, Santa Clara, CA (US); Yamini Kalyandurga Balasubramanyam, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 275 days.

(21) Appl. No.: 14/864,797

(22) Filed: Sep. 24, 2015

(65) Prior Publication Data
US 2016/0094404 A1 Mar. 31, 2016

Related U.S. Application Data

(60) Provisional application No. 62/055,579, filed on Sep. 25, 2014.

(51) Int. Cl.
*H04L 12/24* (2006.01)
*H04L 12/26* (2006.01)
*H04L 29/08* (2006.01)

(52) U.S. Cl.
CPC .............. *H04L 67/10* (2013.01); *H04L 41/28* (2013.01); *H04L 41/5041* (2013.01); *H04L 43/14* (2013.01)

(58) Field of Classification Search
None
See application file for complete search history.

(56) References Cited

U.S. PATENT DOCUMENTS

| | | | | |
|---|---|---|---|---|
| 7,660,824 B2* | 2/2010 | Halpern | .............. | H04L 41/0873 707/770 |
| 7,685,131 B2* | 3/2010 | Batra | ................ | G06F 17/30575 707/999.01 |

(Continued)

*Primary Examiner* — Patrice L Winder
(74) *Attorney, Agent, or Firm* — Tucker Ellis LLP

(57) ABSTRACT

In accordance with an embodiment, described herein is a system and method for JMX support in an application server environment. An exemplary method can provide, at one or more computers, including an application server environment executing thereon, a plurality of deployable resources which can be used within the application server environment, one or more partitions, a plurality of managed beans, each managed beans being a partition level managed bean or a domain level managed bean, each partition level managed bean originating at an originating partition of the one or more partitions, and a JMX framework comprising an API and a managed bean server. The plurality of managed beans can be registered at the managed bean server, with the partition level managed beans being decorated with an identifier.

20 Claims, 9 Drawing Sheets

(56) References Cited

U.S. PATENT DOCUMENTS

| | | | |
|---|---|---|---|
| 7,698,398 B1* | 4/2010 | Lai | G06F 8/10 |
| | | | 709/223 |
| 7,702,649 B1* | 4/2010 | Bresch | G06F 17/30917 |
| | | | 707/999.104 |
| 9,274,811 B1* | 3/2016 | Reeves | G06F 8/61 |
| 9,442,708 B1* | 9/2016 | Reeves | G06F 8/61 |
| 9,507,587 B2* | 11/2016 | Kirchgaessner | G06F 8/10 |
| 2003/0036919 A1* | 2/2003 | Felt | G06F 9/466 |
| | | | 718/101 |
| 2004/0148569 A1* | 7/2004 | Sengodan | G06F 17/218 |
| | | | 715/239 |
| 2004/0255264 A1* | 12/2004 | Simpson | H04L 41/08 |
| | | | 717/100 |
| 2005/0005200 A1* | 1/2005 | Matena | G06F 9/5072 |
| | | | 714/38.13 |
| 2005/0216585 A1* | 9/2005 | Todorova | H04L 41/22 |
| | | | 709/224 |
| 2005/0273518 A1* | 12/2005 | Patrick | G06Q 10/00 |
| | | | 709/238 |
| 2006/0015881 A1* | 1/2006 | Polozoff | G06F 8/61 |
| | | | 719/330 |
| 2006/0036715 A1* | 2/2006 | Ghattu | H04L 67/125 |
| | | | 709/220 |
| 2006/0036734 A1* | 2/2006 | Breeden | H04L 67/02 |
| | | | 709/225 |
| 2006/0069791 A1* | 3/2006 | Patrick | H04L 67/2823 |
| | | | 709/230 |
| 2008/0155350 A1* | 6/2008 | Ivanov | G06F 11/3495 |
| | | | 714/45 |
| 2010/0333060 A1* | 12/2010 | Kirchgaessner | G06F 8/10 |
| | | | 717/102 |
| 2011/0047453 A1* | 2/2011 | Catalahana | G06F 9/4443 |
| | | | 715/236 |
| 2011/0289509 A1* | 11/2011 | Kothari | G06F 8/60 |
| | | | 718/106 |
| 2012/0167094 A1* | 6/2012 | Suit | G06F 9/5077 |
| | | | 718/100 |
| 2013/0019253 A1* | 1/2013 | Joseph | G06F 11/3006 |
| | | | 719/328 |
| 2013/0104150 A1* | 4/2013 | Rdzak | G06F 9/54 |
| | | | 719/328 |
| 2015/0089031 A1* | 3/2015 | Kalali | H04L 67/34 |
| | | | 709/220 |

* cited by examiner

SYSTEM AND METHOD FOR JMX SUPPORT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR JMX SUPPORT IN A MULTITENANT APPLICATION SERVER ENVIRONMENT", Application No. 62/055,579, filed Sep. 25, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

FIELD OF INVENTION

Embodiments of the invention are generally related to application servers and cloud environments, and are particularly related to a system and method JMX support in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for JMX support in an application server environment. An exemplary method can provide, at one or more computers, including an application server environment executing thereon, a plurality of deployable resources which can be used within the application server environment, one or more partitions, a plurality of managed beans, each managed beans being a partition level managed bean or a domain level managed bean, each partition level managed bean originating at an originating partition of the one or more partitions, and a JMX framework comprising an API and a managed bean server. The plurality of managed beans can be registered at the managed bean server, with the partition level managed beans being decorated with an identifier.

DETAILED DESCRIPTION

In accordance with an embodiment, described herein is a system and method for JMX support in an application server environment. An exemplary method can provide, at one or more computers, including an application server environment executing thereon, a plurality of deployable resources which can be used within the application server environment, one or more partitions, a plurality of managed beans, each managed beans being a partition level managed bean or a domain level managed bean, each partition level managed bean originating at an originating partition of the one or more partitions, and a JMX framework comprising an API and a managed bean server. The plurality of managed beans can be registered at the managed bean server, with the partition level managed beans being decorated with an identifier.

Application Server (e.g., Multi-Tenant, MT) Environment

Figure 1:
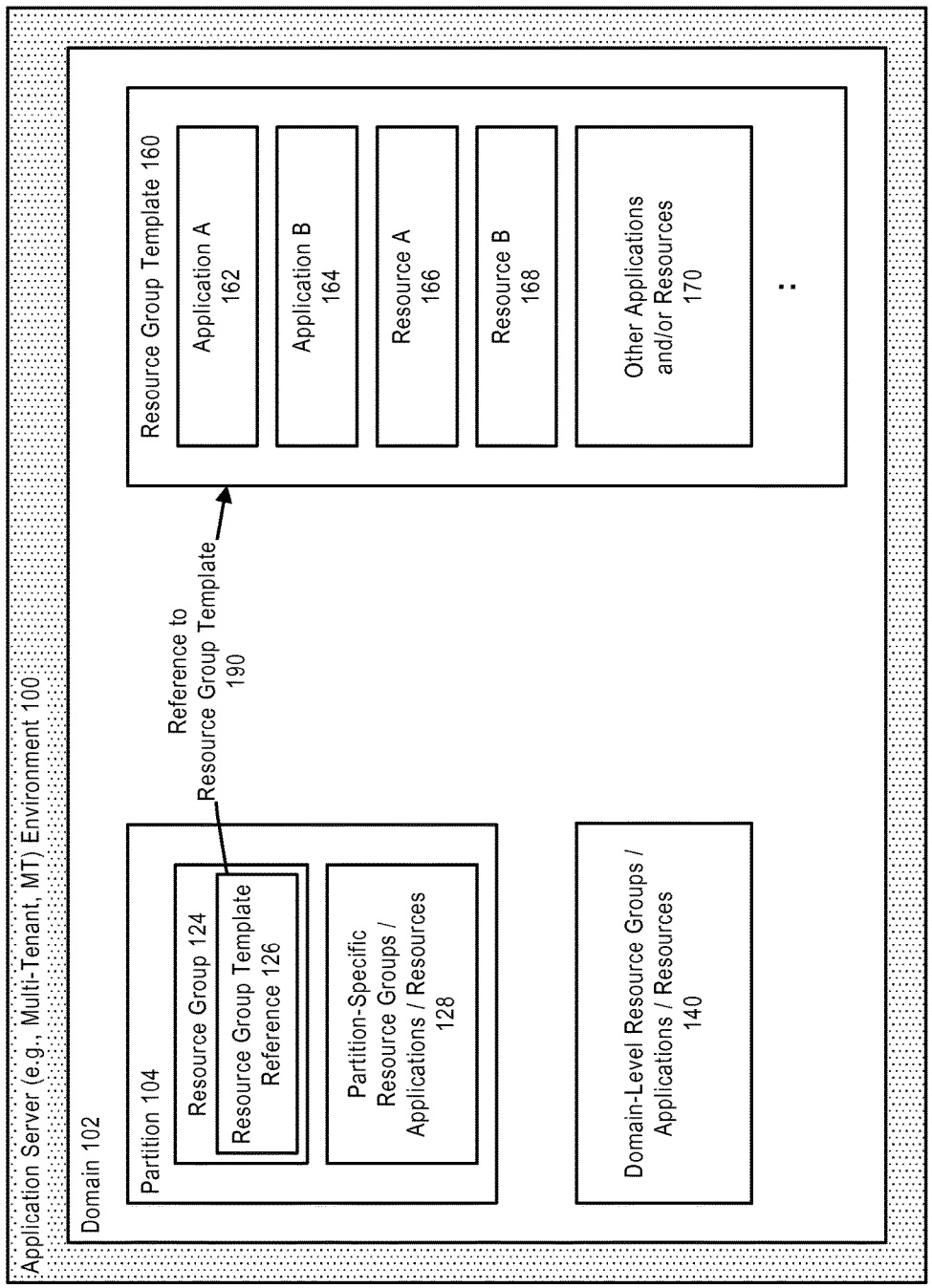
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
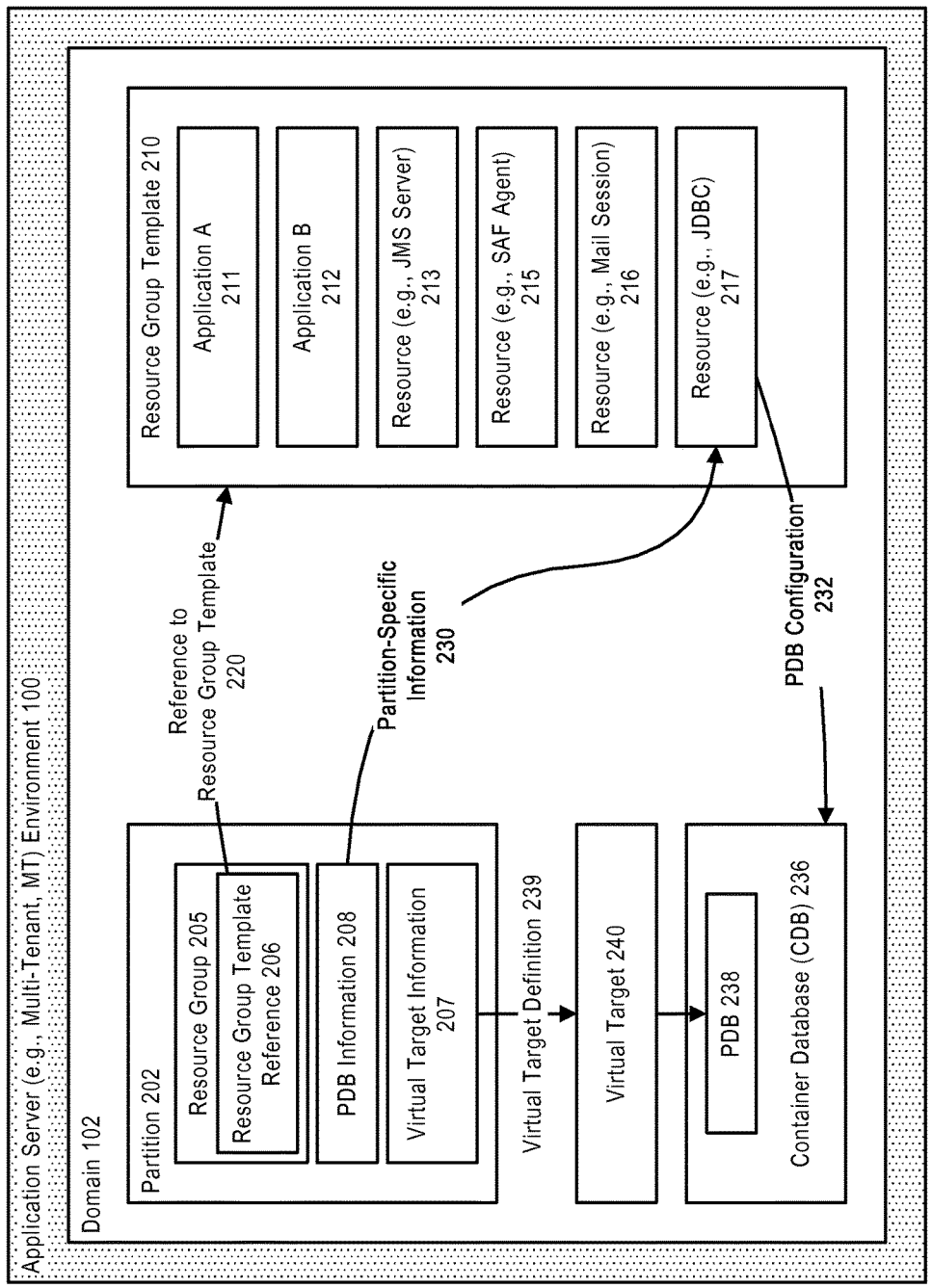
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
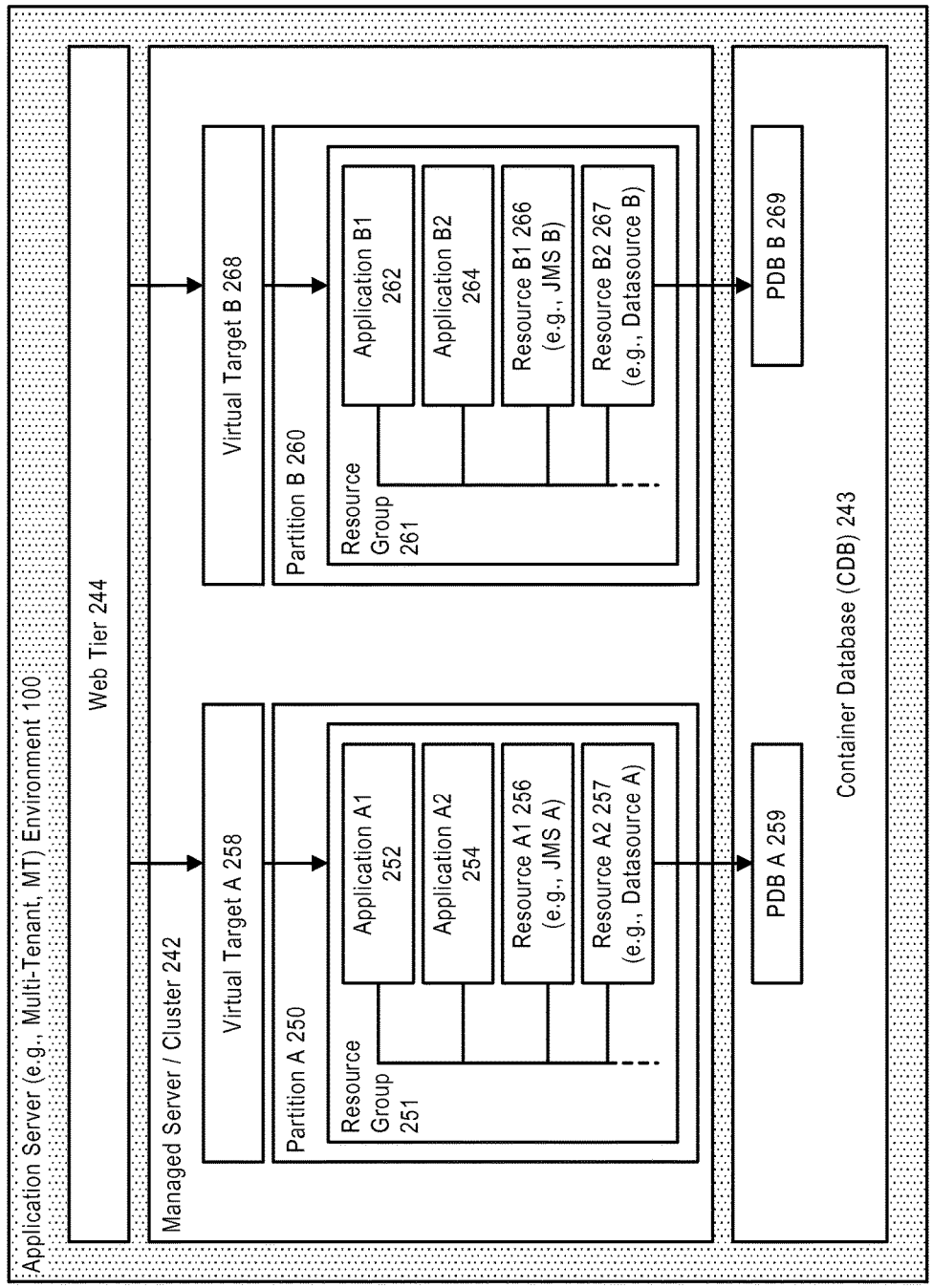
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
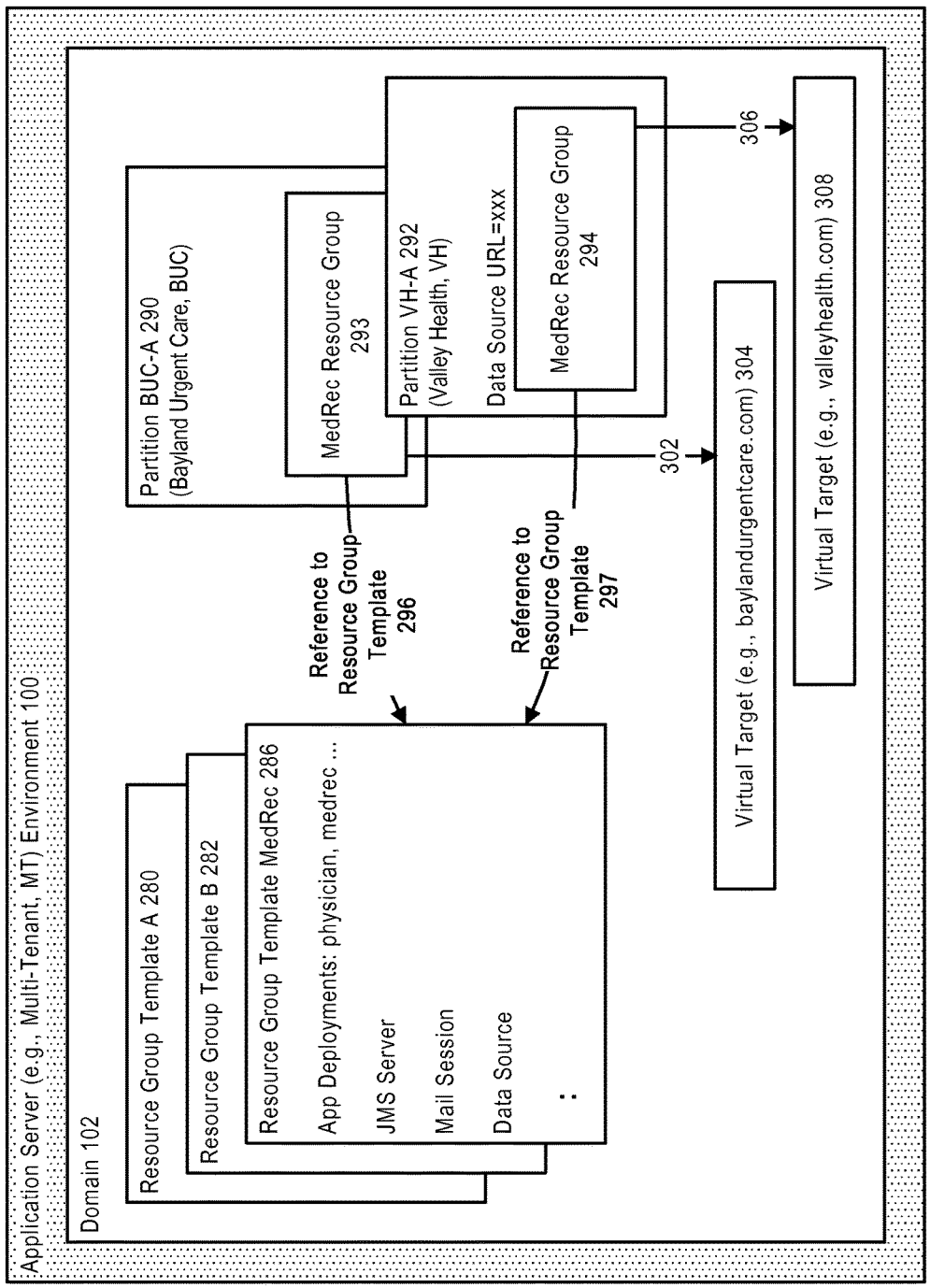
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
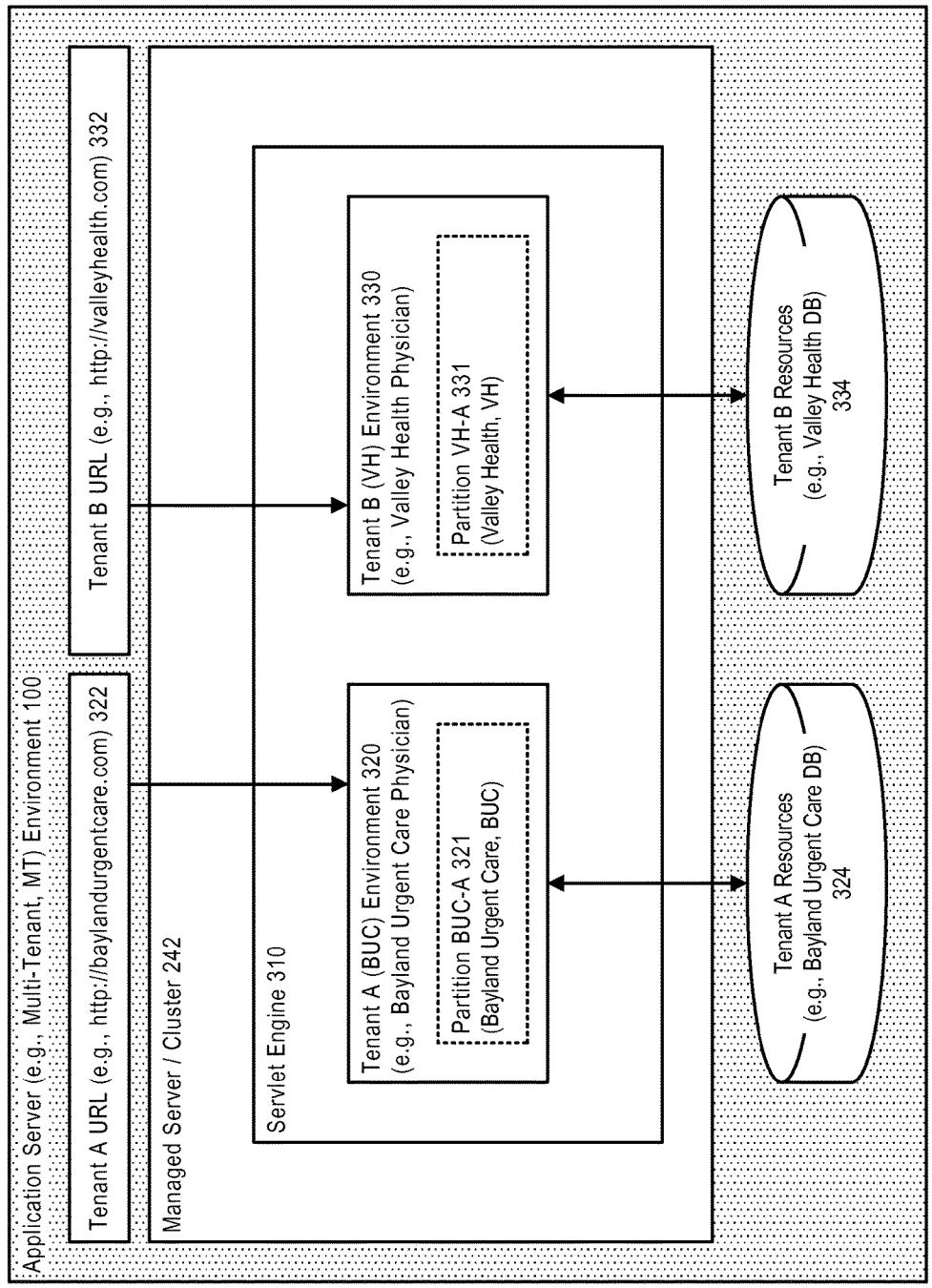
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

JMX Support

In accordance with an embodiment, within an application server environment, such as a multitenant application server environment, an application programming interface (API), such as Java Management Extensions (JMX) API, or another suitable API, can be used to configure and monitor domains within the application server environment. A scripting tool, such as WebLogic Scripting Tool or another suitable scripting tool, can provide a scripting environment that can utilize the APIs. Within a multitenant application server environment, an administrator of a partition can be allowed access to a subset of objects, such as managed beans (MBeans), within the domain. Access to objects, such as MBeans, can be limited within a multitenant application server environment by making changes at the JMX layer. This can support limited access to MBeans at different partitions and/or at the domain level.

In accordance with an embodiment, a framework, such as a Java Required Files (JRF) JMX framework can provide an infrastructure for upper stack products to provide configuration and runtime MBeans. The framework can reside on top of an application server JMX infrastructure, and can support the servers.

In accordance with an embodiment, the system can add a partition specific key to an MBean object name that is registered while running in a partition. This can ensure that MBean object names are unique when registered from an application, for example, running simultaneously in a number of partitions and/or the domain (referred to variously herein as a multiplied application).

Within an application server environment, such as a WebLogic Sever environment operating as multitenant application server, a partition administrator for a partition can have access to MBeans registered from another partition restricted.

Multiplied Applications

Figure 6:
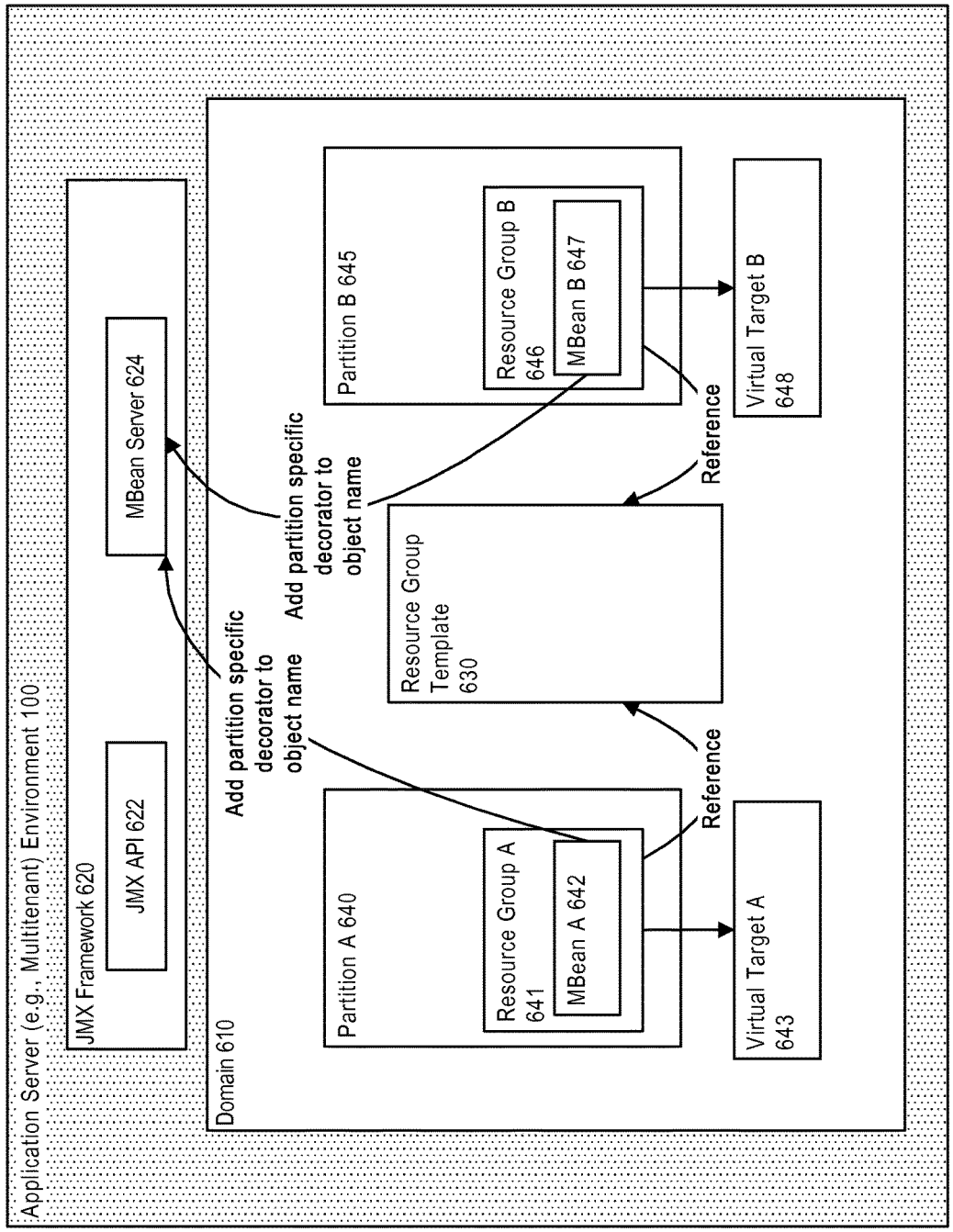
FIG. 6 illustrates JMX support within an application server environment, in accordance with an embodiment.

FIG. 6 illustrates JMX support within an application server environment, in accordance with an embodiment. As shown in the figure, an application server environment 100, such as a multitenant application server environment, can include a domain 610 and a JMX framework 620. The domain 610 can include partitions A and B, 640 and 645 respectively, virtual targets A and B, 643 and 648 respectively, and resource group template 630. Partitions A and B can include resource groups A and B, 641 and 646, respectively, and both resource group A and resource group B can contain one or more MBeans, which are shown as MBean A 642 and MBean B 647 in the Figure. Virtual targets A and B can be associated with resource groups A and B respectively. JMX framework 620 can contain a JMX API 622 and an MBean Server 624.

As more fully described above, both resource groups A and B can reference resource group template 630 to, for example, load an application associated with the resource group template 630. When the application is loaded into a partition, the application will generally be associated with an object, such as an MBean. A problem can arise, however, in the context of two partitions within a same domain loading/running a same application simultaneously. Normally, the application has a same object name (e.g., MBean), and because of this, an error would trigger when a second instance of the application is attempted to be deployed because the application that is attempting to deploy in the second instance will have the same object name as the application deployed in the first instance, and both deployments are within the same domain (albeit from different partitions).

In order to alleviate the issue described above, in accordance with an embodiment, the system can be configured to intercept the created MBeans (i.e., the MBeans created within resource groups A and B) during a register operation (e.g., registering the created MBeans at a MBean server 624) and insert a partition specific decorator (e.g., Partition=partitionname where partitionname is a human-friendly name for a partition, such as "bayland") onto the object name. By inserting the partition specific decorator during the register operation at the MBean server 624, the application can run simultaneously within the application server environment as each instance of the application now has a unique object name (e.g., MBean).

In accordance with an embodiment, the partition specific decorator can be added transparently such that the partition specific decorator will not be surfaced/visible to a partition administrator. More specifically, a partition administrator can be unaware that a partition specific decorator has been added to, upon the register operation to the MBean server, the object name of an application, the application running within the partition administrator's partition.

Restricted Access to MBeans

Figure 7:
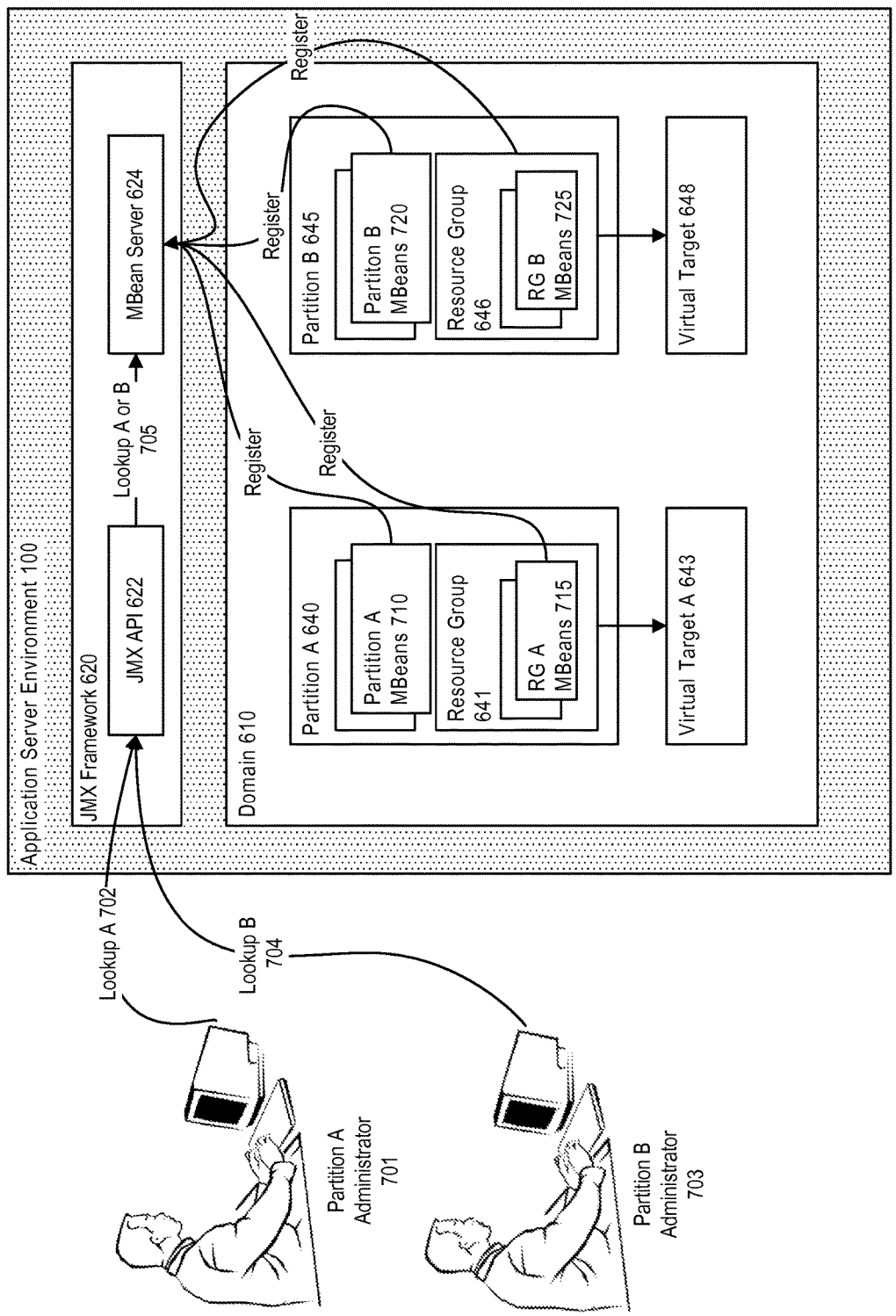
FIG. 7 illustrates JMX support within an application server environment, in accordance with an embodiment.

FIG. 7 illustrates JMX support within an application server environment, in accordance with an embodiment. As shown in FIG. 7, an application server environment 100, such as a multitenant application server environment, can include domain 610 and a JMX framework 620. JMX framework can include JMX API 622 and MBean sever 624. The domain 610 can include partitions A and B, 640 and 645 respectively, and virtual targets A 643 and B 648 respectively. Partitions A and B can include partition A MBeans and partition B MBeans, 710 and 720 respectively, and resource groups A and B, 641 and 646, respectively. Both resource group A and resource group B can contain resource group (RG) MBeans A and B, 715 and 725 respectively. Virtual targets A and B can be associated with resource groups A and B respectively.

The exemplary environment depicted in FIG. 7 additionally allows access by partition A administrator 701 and partition B administrator 703. In accordance with an embodiment, either or both partition A administrator and partition B administrator can perform a lookup, lookup A 702 and lookup B 704 respectively, via the JMX API, of MBeans registered within the MBean server 624. As described above, the various MBeans within the partitions, i.e., partition A MBeans 710, resource group A MBeans 715, partition B MBeans 720, and resource group B MBeans 725, can be registered within the MBean server 624 with a partition specific decorator applied to each MBean registered within the MBean server 624.

In accordance with an embodiment, as shown in FIG. 7, once a lookup, such as lookup A or lookup B, has been received at the JMX API via, for example, a partition specific URL (uniform resource locator), the JMX can allow restricted lookup access within the MBean server for each partition administrator by performing a lookup from A or B 705, and permitting restricted access. For example, when partition A administrator 701 performs a lookup A 702 via the JMX API 622, only those MBeans that partition A administrator has access to, such as, for example, those MBeans that have a decorator of Partition=PartitionA, added to the object names, can be made visible to partition A administrator. Likewise, when partition B administrator 703 performs a lookup B 704 via the JMX API 622, only those MBeans that partition B administrator has access to, such as, for example, those MBeans that have a decorator of Partition=PartitionB, added to the object names, can be made visible to partition B administrator.

In accordance with an embodiment, unless specified, partition A administrator will not have access to partition B MBeans (e.g., partition B MBeans 720 and resource group B MBeans 725) during a lookup, and likewise, partition B administrator will not have access (unless specified to the contrary) to partition A MBeans (e.g., partition A MBeans 710 and resource group A MBeans 715) during a lookup.

Additionally, when either partition A administrator or partition B administrator are allowed lookup access to the respective allowed MBeans within the MBean server, the decorator applied to each partition's MBeans will be hidden, via the JMX API, from the administrators.

In accordance with an embodiment, in addition to providing restricted lookup access to the MBeans registered within the MBean server to partition administrators, the JMX framework can additionally provide restricted actions to partition administrators for other requested actions, such as edit MBeans, delete MBeans, and the like.

Figure 8:
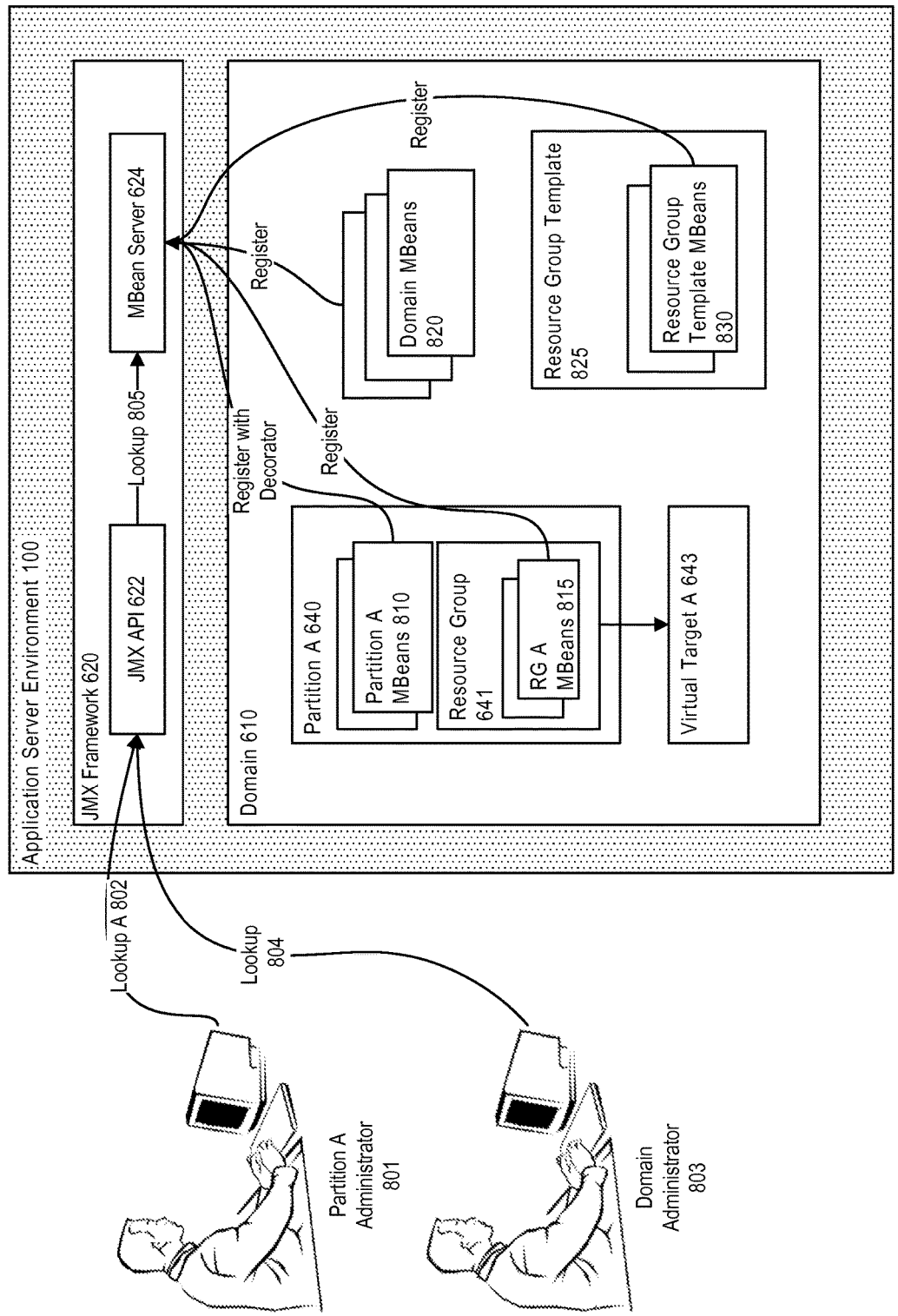
FIG. 8 illustrates JMX support within an application server environment, in accordance with an embodiment.

FIG. 8 illustrates JMX support within an application server environment, in accordance with an embodiment. As shown in the figure, an application server environment 100, such as a multitenant application server environment, can include domain 610 and a JMX framework 620. JMX framework can include JMX API 622 and MBean sever 624. The domain 610 can include partition A 640, virtual target A 643, domain MBeans 820, and resource group template 825. Partitions A can include partition A MBeans 810, and resource group A 641. Resource group A can be associated with resource group (RG) A MBeans 815. Virtual target A can be associated with resource group A. Resource group template 825 can include resource group template MBeans 830.

The exemplary environment depicted in FIG. 8 additionally allows access by partition A administrator 801 and a domain administrator 803. In accordance with an embodiment, either or both partition A administrator and system/domain administrator can perform a lookup, lookup A 802 and lookup 804 respectively, via the JMX API, of MBeans registered within the MBean server 624. As described above, the various MBeans within the partitions, i.e., partition A MBeans 810, resource group A MBeans 815 can be registered within the MBean server 624 with a partition specific decorator applied the object name of each partition level MBean registered within the MBean server 624. When domain level MBeans, such as domain MBeans 820 and resource group template MBeans 830, are registered at the MBean server 624, no decorator is applied to the object name.

In accordance with an embodiment, as shown in FIG. 8, the JMX API 622 receive a lookup, such as lookup A 802 from partition A administrator or lookup 804 from domain administrator. The lookups can be received, for example, via a partition specific URL (uniform resource locator) from partition A administrator, or from global (domain) URL, from domain administrator. In performing lookup 805, the JMX API can allow lookup restricted access within the MBean server for the partition administrator, and unrestricted access for the domain administrator.

For example, when partition A administrator 801 performs a lookup A 802 via the JMX API 622, only those MBeans that partition A administrator has access to, such as, for example, those MBeans that have a decorator of Partition=PartitionA, added to the object names can be made visible to partition A administrator (however, as noted above, this decorator will be hidden from partition A administrator). Access to domain level MBeans, such as domain MBeans 820 and resource group template MBeans 830 is forbidden unless specifically allowed via a configuration. When domain administrator 803 performs a lookup 804 via the JMX API 622, all MBeans within the MBean server will be visible to the system/domain administrator, including any decorators applied to partition level MBeans.

Unless specified, partition A administrator will not have access to domain level MBeans. Additionally, if partition A administrator is granted lookup access to the domain level MBeans, the decorators applied to each of partition A's MBeans can still be hidden from partition A administrator, via the JMX API. In situations where a domain level Mbean is accessible by a partition administrator, the domain level Mbean can be a shared Mbean (i.e., not a partition Mbean), and may not have decorators (e.g., Partition=key).

In accordance with an embodiment, in addition to providing restricted lookup access to the MBeans registered within the MBean server to partition A administrator, the JMX framework can additionally provide restricted access to partition administrator A for other requested actions, such as update MBeans or delete MBeans.

Figure 9:
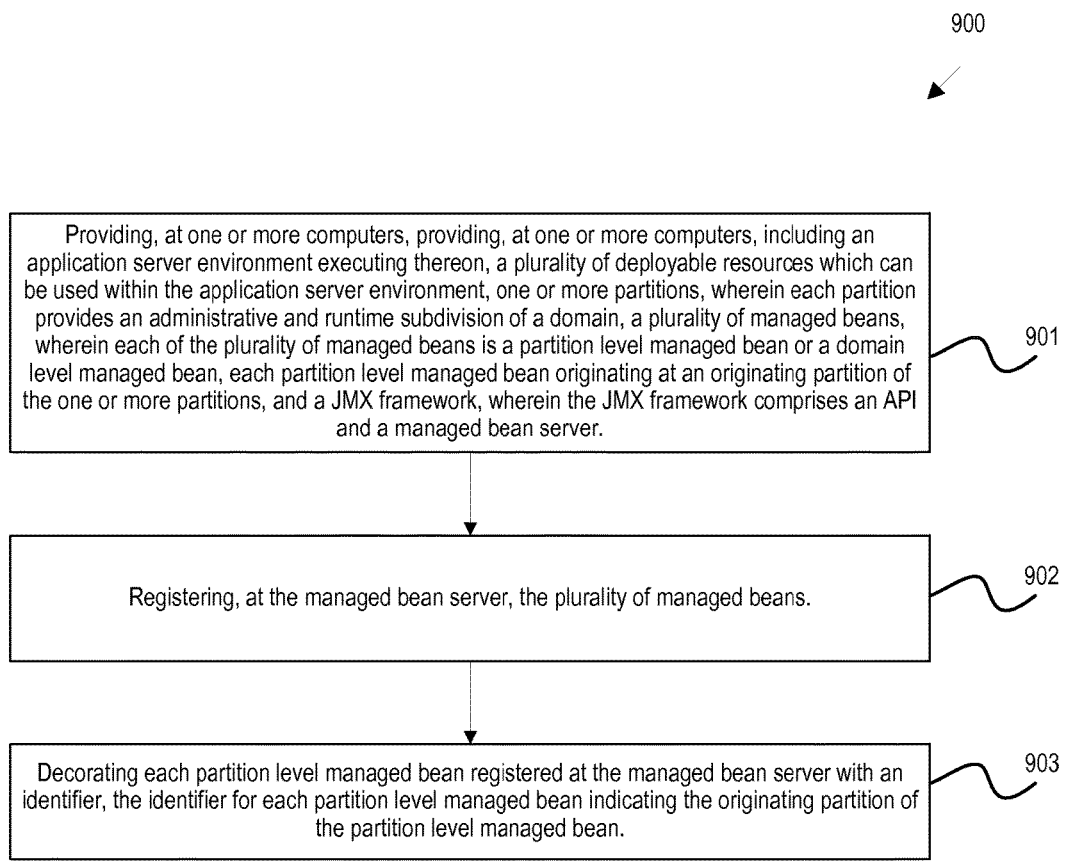
FIG. 9 illustrates, via a flow chart, a method for JMX support within an application server environment, in accordance with an embodiment.

FIG. 9 illustrates, via a flow chart, a method for JMX support within an application server environment, in accordance with an embodiment. As depicted in FIG. 9, an exemplary method 900 can begin at step 901 with providing, at one or more computers, including an application server environment executing thereon, a plurality of deployable resources which can be used within the application server environment, one or more partitions, wherein each partition provides an administrative and runtime subdivision of a domain, a plurality of managed beans, wherein each of the plurality of managed beans is a partition level managed bean or a domain level managed bean, each partition level managed bean originating at an originating partition of the one or more partitions, and a JMX framework, wherein the JMX framework comprises an API and a managed bean server. At step 902, the method can register, at the managed bean server, the plurality of managed beans. At step 903, the method can decorate each partition level managed bean registered at the managed bean server with an identifier, the identifier for each partition level managed bean indicating the originating partition of the partition level managed bean.

Access to MBeans from Other Partitions or to Non-Partition MBeans

In accordance with an embodiment, a partition administrator for a partition can be disallowed access to MBeans from another.

In accordance with an embodiment, by default, a partition administrator will not have access to domain level MBeans. This default can be changed/overridden within a configuration.

In accordance with an embodiment, by default a partition administrator will not be able to update MBeans that are not in a partition, and more specifically, not in the partition administrator's partition. In situations where a partition administrator is granted access to domain-level MBeans, those domain-level MBeans which are visible to a partition can be read-only accessible to partition administrators. A mechanism can be provided to MBean authors to override default MBean visibility and authorization policies to expose domain level MBeans to partitions.

MBean Object Names for Partition

In accordance with an embodiment, a partition specific key to custom MBean object names can be added that are registered while running in a partition. This can ensure that MBean object names are unique when registered from a multiplied application. Partition administrators connected to a partition specific URL will not see these partition keys in the object name, but system/domain administrators connected to the global URL can see them. This can allow a system/domain administrator to distinguish partition specific MBeans.

Partition ID Propagation for Domain Runtime MBeanServer Delegated Requests

In accordance with an embodiment, JMX clients can connect to a domain runtime MBean server using a partition specific URL. If a JMX request is delegated to a managed server, then the system can ensure that the partition ID is propagated to the managed server and set appropriately on the thread executing the JMX operation. In situations when JMX clients connect via a partition specific URL, the request can be associated with the partition ID for the partition based upon the partition specific URL.

Security Annotations to Control Default Policies for MBean Authorization

In accordance with an embodiment, a system, such as WebLogic Server, can have an existing security annotation, e.g., @roleAllowed, that is used to allow control over the default authorization policies for MBean resources. The system can add a new security annotation, such as @roleExcluded, in order to allow finer control for MBean resources. @roleExcluded role—can mark the MBean, method, or attribute as not accessible by a partition user role. It can remove any MBean specified roleAllowed roles or any grants added by the default policies.

In accordance with an embodiment, the above can be default authorization policies. Users can be allowed to define a custom authorization policy that allows wider access to MBeans within the domain. For example, subsystems can determine whether to use the @roleExcluded annotation. It can be used when a partition administrator should not be allowed to modify a particular attribute. This, for example, can be an attribute that only a system/domain administrator can be allowed to modify. It can also be used in cases where just one or two attributes in an MBean are not appropriate for a partition administrator. If, for example, there are large numbers of excluded attributes, then a new MBean can be introduced with just the attributes that a partition administrator is allowed to modify.

Ownership of MBeans

In accordance with an embodiment, an MBean server implementation can maintain a mapping between a partition and registered MBeans. An internal interface can provide a mechanism to return the partition for an MBean contained in the MBean server. For example, MBeans associated with a partition can typically contain either "Partition=partitionname", "PartitionRuntime=partitionname" or "DomainPartitionRuntime=partitionname" in the MBean's objectname. The PartitionMBean, PartitionRuntimeMBean and DomainPartitionRuntime MBeans are an exception. The name key can be used to distinguish these MBeans between various partitions.

The default ownership of MBean can, in accordance with an embodiment, be changed with @owner to override the default behavior.

MBean Partition ID Value

In accordance with an embodiment, a component invocation context (CIC) can be available to MBeans when operations are invoked. The CIC contains information about the source of a request including, for example, partition ID, partition name, application name, application ID, application version, component name, and module name. MBeans can use this context to respond to requests according to their source.

Partition ID Propagation via a Component Invocation Context

In accordance with an embodiment, the following rules can establish what the CIC should be set for incoming MBean invocations for the two possible contexts (domain and partition). This can apply to, for example, JRF (Java Required Files), WLS (WebLogic Server) and application scoped MBeans. The MBeans can be accessed via a partition URL or a domain URL. Rule 1: If a request is being made to a partition owned MBean, the CIC should be set to that partition. The source of the request is not a factor in the CIC value. If the source of the request is a partition context then the system needs do nothing. If the source of the request is the global context, then the system can set the CIC to the partition. Rule 2: If a request is being made to a domain MBean, then the CIC should be based on the origin of the request. If the request is originating from a partition, then the CIC should reflect that partition. If the request is originating from the global runtime, then the CIC should reflect the domain.

In accordance with an embodiment, partition MBeans are not designed to be shared. Therefore, a partition MBean should only expect the CIC for incoming requests to be for the partition that owns the MBean. Domain MBeans that are not designed to be multitenant aware generally will ignore the CIC setting as the MBeans can assume the context in which they are invoked. This assumption about that context can be assured because the default visibility for global MBeans is to make them not visible to partitions. Global MBeans which are partition aware can take steps to be visible as well as account for the CIC value when performing a target action (invoke, get, set, and the like).

In accordance with an embodiment, in order to allow access to a global domain MBean from a partition, the MBean author can first override the default visibility.

CIC for Application MBeans

In accordance with an embodiment, applications can be deployed to a global/domain level, and/or a partition level. Because application MBeans can be registered during application deployment, application MBeans can be run in the global/domain context and/or in the partition context. The CIC can be set for the application MBeans during application deployment. The CIC can contain information about the partition id, the partition name, the application id, the application name, the application version, and the like. The application name in the CIC associated with application MBeans can be the deployment name used during the application deployment. By checking the application name in the CIC associated with the MBeans, a user/administrator can determine if the MBean is an application MBean. If the application name in the CIC is not null, the MBean can be an application MBean.

Object Names and Filtering Examples

In accordance with an embodiment, when an administrator is connected to the domain URL, the system will not filter the results returned by a JMX queryNames or queryMBeans call. All system MBeans and application MBeans can be made visible as a connection to a domain URL indicates a system/domain administrator. In addition, the Partition=key will be visible and no partition key processing will be performed. A JMX client can ensure that JMX operations deal with the Partition=key appropriately on queries or get/set operations.

In accordance with an embodiment, when connected to a partition specific URL, the system can filter out domain level MBeans and application and/or JRF MBeans that are registered by the applications deployed to the domain. The system can also filter out any MBeans from other partitions.

The system, in accordance with an embodiment, can also filter the results returned by JMX operations when connected to a partition specific URL. For example, the system can remove the partition specific key from any object name that are returned from a queryNames or queryMBeans call. The system will also ensure that the partition specific key is added on any JMX calls on a specific object name.

In accordance with an embodiment, the existence of an MBean at the partition level will prevent access (via a partition URL) to an MBean of the same name provisioned in the global runtime. This is because from the partition's point of view, the MBeans have the same name (because the partition decorator is stripped from the partition's view) and the partition specific version will take precedence. Conversely, from the global runtime perspective, both MBeans (partition and domain) can be seen. The two MBeans can be differentiated by the existence of the Partition=partitionname (or PartitionRuntime or DomainPartitionRuntime) key in the object name of one of the MBeans.)

MBean Access

In accordance with an embodiment, when an application is deployed to both the domain as well as partitions, the application MBeans are multiplied. When this occurs, MBeans in the domain scope do not have the Partition key decorator on the ObjectName. MBeans in the partition scope can have the Partition key decorator on the ObjectName. When accessing the MBeans from a partition URL, the MBean with the Partition=<partitionName> decorator on the ObjectName will first be accessed. If this MBean is not found, the MBean without the Partition key decorator will be accessed. This can ensure the MBeans owned by the current partition have precedence over domain level MBeans with the same ObjectName.

Default JMX Policies

In accordance with an embodiment, MBean interfaces can be annotated with @roleAllowed or @rolePermitAll and @owner annotations to control the default policies for JMX Resource authorization. A administrator or partition administrator can get encrypted information for MBeans they can see. Additionally, the authorization rules/policies can be enforced for MBeans that are visible to users, such as administrators or partition administrators. For a multitenant environment, the default policies can be modified to become partition aware. Users can have access to all find methods (lookupXXX). As well, users have read access to all non-encrypted attributes. Setting requires Admin or partition Admin role. An admin or partition admin can get encrypted attributes. An invocation of a method can require Admin or partition Admin role. Finally, create and unregister actions can require Admin or partition Admin role.

In accordance with an embodiment, role mapping can ensure that the partition admin role is granted for the appropriate resources. Filtering at the JMX level can also ensure a partition specific user cannot access (see) MBeans from a different partition.

Ownership Policy for Multitenant JMX

In accordance with an embodiment, the location of deployment a JMX MBean can determine the ownership of the JMX MBean. This ownership can be overridden by @owner which can take three values: domain, partition and context. In situations where a domain MBean needs to be shared to the partitions, then the MBean or its members can be annotated with @owner Context.

In accordance with an embodiment, security of an MBean deployed to a certain scope is an aspect of the JMX layer. There can be two scopes in a multitenant application server environment, namely domain and partition. A role from the domain scope (e.g., admin, operator, monitor, and deployer roles in a domain) can access an MBean deployed in a partition. A role from the partition scope partition (e.g., admin, monitor, operator, and deployer roles in a partition) cannot access an MBean deployed at the domain level. A partition administrator has full access on the partition in which the user is defined but not on any other partition.

In accordance with an embodiment, a default ownership of an MBean or its members (attribute or operation) can be determined by the location where the MBean is deployed. For example, an MBean is owned by a domain if the MBean is deployed at the domain level. Likewise, an MBean is owned by a particular partition if the MBean is deployed in a particular partition.

The default ownership of an MBean or its members, in accordance with an embodiment, can be overridden by @owner. There can be three values: domain, partition and context. In a situation where an MBean is deployed in a partition and that MBean or one of its operations is overridden by @owner domain, then the ownership of that MBean belongs to the domain and not the partition where it's deployed.

In accordance with an embodiment, a role from a scope can be annotated with @roleAllowed to allow access on an MBean from that scope or level. For example, if access is needed for monitor role on a domain owned MBean, then that domain owned MBean can be annotated with @roleAllowed monitor. As another example, if an access is required for monitor role on a partition owned MBean, then the partition level MBean can be annotated with @roleAllowed monitor. However, putting @roleAllowed monitor on domain owned MBean does not necessarily grant access to a partition monitor role.

A domain/system administrator can have access on everything on a domain and all partitions within the domain. A partition administrator has default access on all the MBeans owned by that partition. No annotation is needed to achieve this behavior. In a situation where an MBean is located in a partition, but ownership is overriden by @owner domain, then the partition administrator can have access to that resource/object restricted.

In accordance with an embodiment, if an MBean needs to be accessed by roles from a different scope, then the MBean can be annotated with @owner context. This can signify that ownership of the MBean is determined by the CIC (Component Invocation Context). For example, when an MBean is annotated with @owner context and @roleAllowed monitor, then the MBean can be accessed by both the monitor roles from domain and the partitions.

When an @owner annotation appears on an attribute, the annotation on the attribute or operation takes precedence over the annotation on interface.

What follows is an example usage of ownership annotation:

```
1) Annotate an MBean like below will allow domain deployer and
partition deployer both access to any operations or attributes on
DomainRuntimeMBean
/**
* @roleAllowed Deployer
* @owner Context
*/
public interface DomainRuntimeMBean
2) Annotate an MBean like below will allow domain deployer and
partition deployer both access only to the getName operation on
DomainRuntimeMBean
public interface DomainRuntimeMBean
{
/**
* @roleAllowed Deployer
* @owner Context
*/
public String getName( )
}
```

Partition Keys in Object Names

In accordance with an embodiment, the methods and systems described herein can add a Partition=, PartitionRuntime= or DomainPartitionRuntime=keys to an MBean registered in the MBean Server when running in connection with a partition ID. This can ensure that the object names are unique for multiplied applications. A system/domain administrator that connects to a non-partition URL (i.e., a global/domain URL) can query MBeans that contain the partition decorator keys.

In some embodiments, the Partition=key can primarily be used for configuration related MBeans, while the PartitionRuntime=key can be used for runtime MBeans. The DomainPartitionRuntime=key can be used for domain runtime MBeans.

In accordance with an embodiment, partition administrators that connect through a partition specific URL can only see the partition specific MBeans. The partition specific decorator keys will be removed in any query results made from a partition administrator connected through a partition specific URL. Calls to get/set will add back the partition key so that the set/get is called on the correct partition specific MBean.

MBean Visibility

In accordance with an embodiment, domain level MBeans are not automatically visible to partitions (i.e., partition administrators connected through a partition specific URL). As described above, though, domain level MBeans can be made visible to partition administrators. However, within a multitenant application server environment, making such MBeans visible to partition administrators can be guided by a set of rules.

For example, by default, all domain owned (global) MBeans are not visible to partitions. Discrete MBeans or MBean attributes can be made visible to partitions by using an annotation, such as a @VisibleToPartitions annotation.

In accordance with an embodiment, in a system that contains more than one partition, when a partition administrator is granted access to a domain owned MBean, other partition's MBeans under the domain owned MBean are invisible to the partition administrator that has been granted access. For example, within an MBean tree, two partition MBean trees branch off of a domain owned MBean, branch 1 and branch 2. When a partition administrator associated with branch 1 is granted view access to the domain owned MBean, the partition administrator will still be limited to those MBeans associated with its partition (i.e., MBeans that contain the correct Partition=key), and those MBeans associated with branch 2 will be invisible to the partition administrator.

Management Object in WLST

In accordance with an embodiment, the methods and systems described herein can organize MBeans in a hierarchical data model. A scripting tool, such as WebLogic Scripting Tool (WLST), can enable a user, such as an administrator, to navigate the hierarchy of MBeans in a similar fashion to navigating a hierarchy of files in a file system. The hierarchy of MBeans can have different types of MBeans. Each type of MBeans can be arranged in a type-specific tree hierarchy data structure.

In accordance with an embodiment, an MBean tree will generally begin at domain level MBeans. When a partition administrator connects, via, for example, WLST, to a partition using a partition specific URL, the partition administrator will not initially be placed in the root of the MBean tree because that the partition administrator is, by default, not granted access to most of the attributes and operations available on that MBean tree. The partition administrator can, instead, be initially placed in the root of a partition sub-tree of the MBean tree. This is the MBean that contains most of the attributes and operations available to the partition.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for Java Management Extensions (JMX) support in an application server environment, comprising:
   one or more computers, including an application server that enables deployment and execution of software applications, wherein the application server is associated with a domain configuration that is used at runtime to define a domain for execution of the software applications, together with
   a plurality of deployable resources which can be used within the application server environment,
   one or more partitions included within the domain, wherein each partition provides an administrative and runtime subdivision of the domain, is associated with a partition identifier, and acts as a binding of a deployable resource of the plurality of deployable resources to configuration values for the deployable resource that are specific to, and for use with, each respective partition,
   a plurality of managed beans, wherein each of the plurality of managed beans is associated with an instance of one of the plurality of deployable resources, and is one of a partition level managed bean or a domain level managed bean, each partition level managed bean originating at an originating partition of the one or more partitions and associated with an instance of the deployable resource of the plurality of deployable resources to which the originating partition binds said configuration values to; and
   a JMX framework, wherein the JMX framework comprises an application programming interface (API) and a managed bean server, wherein each of the plurality of managed beans is registered at the managed bean server; and
   wherein each partition level managed bean registered at the managed bean server is decorated with an identifier, the identifier indicating the originating partition of the partition level managed bean.

2. The system of claim 1, wherein the JMX framework is configured to receive a request from a partition administrator, via a partition specific uniform resource locator (URL), to access one or more of the plurality of managed beans registered at the managed bean server.

3. The system of claim 2, wherein the API is configured to, based at least upon the partition specific URL, restrict access to the plurality of managed beans registered at the managed bean server.

4. The system of claim 3, wherein restricting access to the plurality of managed beans registered at the managed bean server comprises:
   determining an association between the partition specific URL and a particular partition of the one or more partitions and;
   based upon the determination, allowing access to partition level managed beans decorated with a decorator associated with the particular partition of the one or more partitions.

5. The system of claim 4, wherein the decorator associated with the requesting partition is hidden from the partition administrator.

6. The system of claim 1, wherein the application server environment comprises a multi-tenant application server environment, and wherein the system can associate the one or more partitions with a tenant, for use by the tenant.

7. The system of claim 1, wherein the JMX framework is configured to receive a request from a system administrator, via a global uniform resource locator (URL), to access one or more of the managed beans, and, based upon a determination by the API that the request was received via the global URL, allow access to the plurality of managed beans registered at the managed bean server.

8. A method for Java Management Extensions (JMX) support in an application server environment, comprising:
providing, at one or more computers, including an application server that enables deployment and execution of software applications and is associated with a domain configuration that is used at runtime to define a domain for execution of the software applications,
a plurality of deployable resources which can be used within the application server environment,
one or more partitions included within the domain, wherein each partition provides an administrative and runtime subdivision of the domain, is associated with a partition identifier, and acts as a binding of a deployable resource of the plurality of deployable resources to configuration values for the deployable resource that are specific to, and for use with, each respective partition,
a plurality of managed beans, wherein each of the plurality of managed beans is associated with an instance of one of the plurality of deployable resources, and is one of a partition level managed bean or a domain level managed bean, each partition level managed bean originating at an originating partition of the one or more partitions and associated with an instance of the deployable resource of the plurality of deployable resources to which the originating partition binds said configuration values to, and
a JMX framework, wherein the JMX framework comprises an application programming interface (API) and a managed bean server;
registering, at the managed bean server, the plurality of managed beans; and
decorating each partition level managed bean registered at the managed bean server with an identifier, the identifier indicating the originating partition of the partition level managed bean.

9. The method of claim 8, further comprising:
receiving a request, from a partition administrator via a partition specific uniform resource locator (URL), to access one or more of the plurality of managed beans registered at the managed bean server.

10. The method of claim 9, wherein the API is configured to, based upon the partition specific URL, restrict access to the plurality of managed beans registered at the managed bean server.

11. The method of claim 10, the restricting access to the plurality of managed beans registered at the managed bean server comprises:
determining an association between the partition specific URL and a particular partition of the one or more partitions and;
based upon the determination, allowing access to partition level managed beans decorated with a decorator associated with the particular partition of the one or more partitions.

12. The method of claim 11, further comprising:
hiding, from the partition administrator, the decorator associated with the requesting partition.

13. The method of claim 8, wherein the application server environment comprises a multi-tenant application server environment, and wherein the system can associate the one or more partitions with a tenant, for use by the tenant.

14. The method of claim 8, further comprising:
receiving a request, from a system administrator via a global uniform resource locator (URL), to access one or more of the plurality of managed beans registered at the managed bean server; and
based upon a determination by the API that the request was received via the global URL, allowing access to the plurality of managed beans registered at the managed bean server.

15. A non-transitory computer readable storage medium, including instructions stored thereon for Java Management Extensions (JMX) support in an application server environment which when read and executed by one or more computers cause the one or more computers to perform steps comprising:
providing, at one or more computers, including an application server that enables deployment and execution of software applications and is associated with a domain configuration that is used at runtime to define a domain for execution of the software applications,
a plurality of deployable resources which can be used within the application server environment,
one or more partitions included within the domain, wherein each partition provides an administrative and runtime subdivision of the domain, is associated with a partition identifier, and acts as a binding of a deployable resource of the plurality of deployable resources to configuration values for the deployable resource that are specific to, and for use with, each respective partition,
a plurality of managed beans, wherein each of the plurality of managed beans is associated with an instance of one of the plurality of deployable resources, and is one of a partition level managed bean or a domain level managed bean, each partition level managed bean originating at an originating partition of the one or more partitions and associated with an instance of the deployable resource of the plurality of deployable resources to which the originating partition binds said configuration values to, and
a JMX framework, wherein the JMX framework comprises an application programming interface (API) and a managed bean server;
registering, at the managed bean server, the plurality of managed beans; and
decorating each partition level managed bean registered at the managed bean server with an identifier, the identifier indicating the originating partition of the partition level managed bean.

16. The non-transitory computer readable storage medium of claim 15, the steps further comprising:
receiving a request, from a partition administrator via a partition specific uniform resource locator (URL), to access one or more of the plurality of managed beans registered at the managed bean server.

17. The non-transitory computer readable storage medium of claim 16, wherein the API is configured to, based upon the partition specific URL, restrict access to the plurality of managed beans registered at the managed bean server.

18. The non-transitory computer readable storage medium of claim 17, the steps further comprising:
determining an association between the partition specific URL and a particular partition of the one or more partitions and;
based upon the determination, allowing access to partition level managed beans decorated with a decorator associated with the particular partition of the one or more partitions.

19. The non-transitory computer readable storage medium of claim 18, the steps further comprising:
  hiding, from the partition administrator, the decorator associated with the requesting partition.

20. The non-transitory computer readable storage medium of claim 15, the steps further comprising:
  receiving a request, from a system administrator via a global uniform resource locator (URL), to access one or more of the plurality of managed beans registered at the managed bean server; and
  based upon a determination by the API that the request was received via the global URL, allowing access to the plurality of managed beans registered at the managed bean server.

* * * * *

UNITED STATES PATENT AND TRADEMARK OFFICE
CERTIFICATE OF CORRECTION

PATENT NO. : 10,051,043 B2
APPLICATION NO. : 14/864797
DATED : August 14, 2018
INVENTOR(S) : Kasso et al.

Page 1 of 1

It is certified that error appears in the above-identified patent and that said Letters Patent is hereby corrected as shown below:

In the Specification

Column 1, Line 20, above "FIELD OF INVENTION" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

Signed and Sealed this
Fourteenth Day of May, 2019

Andrei Iancu
*Director of the United States Patent and Trademark Office*